(12) United States Patent
Kuwahara

(10) Patent No.: US 6,429,566 B1
(45) Date of Patent: Aug. 6, 2002

(54) ROTOR OF ROTATING MACHINE

(75) Inventor: Tohru Kuwahara, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/696,950

(22) Filed: Oct. 27, 2000

(30) Foreign Application Priority Data

Nov. 10, 1999 (JP) .......................................... 11-320138

(51) Int. Cl.$^7$ .......................... H02K 21/12; H02K 1/22
(52) U.S. Cl. .................. 310/156.56; 310/261; 310/268
(58) Field of Search ................................ 310/156, 261, 310/268

(56) References Cited

U.S. PATENT DOCUMENTS

| | | | | |
|---|---|---|---|---|
| 4,117,360 A | * | 9/1978 | Richter ........................ | 310/183 |
| 4,127,786 A | * | 11/1978 | Volkrodt ...................... | 310/156 |
| 4,339,874 A | | 7/1982 | McCarty et al. ............... | 29/598 |
| 4,504,755 A | | 3/1985 | Semones et al. ............. | 310/156 |
| 4,725,750 A | * | 2/1988 | Welch ......................... | 310/156 |
| 5,097,166 A | * | 3/1992 | Mikulic .................. | 310/156.83 |
| 5,369,325 A | * | 11/1994 | Nagate et al. ............... | 310/156 |
| 5,378,953 A | * | 1/1995 | Uchida et al. ............... | 310/156 |
| 5,463,262 A | * | 10/1995 | Uchida ........................ | 310/156 |
| 5,510,662 A | * | 4/1996 | Tanimoto et al. ........ | 310/156.53 |
| 5,731,647 A | * | 3/1998 | Schuller et al. ............. | 310/114 |
| 5,786,650 A | * | 7/1998 | Uchida et al. ............... | 310/156 |
| 5,811,904 A | * | 9/1998 | Tajima et al. .......... | 310/156.45 |
| 5,844,344 A | * | 12/1998 | Uetake et al. ............... | 310/156 |
| 5,864,192 A | * | 1/1999 | Nagate et al. .......... | 310/156.05 |
| RE36,367 E | * | 11/1999 | Nagate et al. ............... | 310/156 |
| 6,005,318 A | * | 12/1999 | Pop, Sr. ...................... | 310/156 |
| 6,008,559 A | * | 12/1999 | Asano et al. .......... | 310/156.53 |
| 6,025,667 A | * | 2/2000 | Narita et al. ............ | 310/156.53 |
| 6,087,751 A | * | 7/2000 | Sakai .................... | 310/156.45 |
| 6,121,706 A | * | 9/2000 | Nashiki et al. ............. | 310/168 |
| 6,133,662 A | * | 10/2000 | Matsunobu et al. ... | 310/156.12 |
| 6,147,428 A | * | 11/2000 | Takezawa et al. ..... | 310/156.57 |
| 6,246,141 B1 | * | 6/2001 | Bailey ........................ | 310/211 |
| 6,246,147 B1 | * | 6/2001 | Hockemeyer et al. ...... | 310/268 |
| 6,259,180 B1 | * | 7/2001 | Pop, Sr. ...................... | 310/156 |
| 6,268,677 B1 | * | 7/2001 | Takabatake et al. ........ | 310/156 |
| 6,274,960 B1 | * | 8/2001 | Sakai et al. ................. | 310/156 |
| 6,329,734 B1 | * | 12/2001 | Takahashi et al. ..... | 310/156.07 |
| 6,342,745 B1 | * | 1/2002 | Sakai et al. ............ | 310/156.07 |
| 6,356,001 B1 | * | 3/2002 | Nishiyama et al. ........ | 180/65.1 |

FOREIGN PATENT DOCUMENTS

| | | |
|---|---|---|
| EP | 0096515 | 12/1983 |
| FR | 1150327 | 1/1958 |
| GB | 1503708 | 3/1978 |
| JP | 58151858 | 9/1983 |
| JP | 03036939 | 2/1991 |

* cited by examiner

Primary Examiner—Nestor Ramirez
Assistant Examiner—Pedro J. Cuevas
(74) Attorney, Agent, or Firm—Antonelli, Terry, Stout & Kraus, LLP

(57) ABSTRACT

A rotor of a rotating machine includes: a shaft having an axis of rotation and a cylindrical body portion disposed substantially integrally therein; permanent magnets and magnetic members provided integrally within the body portion and arranged radially and circumferentially alternating and in intimate contact with each other, each of the permanent magnets being completely embedded in the body portion and each of the magnetic members having only a radially outward end surface thereof being exposed and having all other surfaces thereof being in embedded in the body portion. The shaft and permanent magnets and magnetic members and body portion are integrated upon the body portion being cast. A circumferential length, defined to be a greatest distance between surfaces of adjacent magnets, is larger than a radial length of one of the magnets, the radial light being defined to be a distance between a point on the magnet closest to the axis of rotation of the shaft and a point on the magnet furthest away from the axis of rotation of the shaft.

8 Claims, 12 Drawing Sheets

ROTOR OF ROTATING MACHINE

FIELD OF THE INVENTION

This invention relates to a rotor of a rotating machine which is an electric generator or an electric motor. More specifically, the invention relates to a motor of a rotating machine, comprising a body portion having a rotating shaft mounted therein substantially integrally, and being composed of a nonmagnetic material; and permanent magnets and magnetic members provided integrally with the body portion and arranged radially and circumferentially alternately in intimate contact with each other.

DESCRIPTION OF THE PRIOR ART

An example of a rotor constituting a rotating machine which is an electric generator or an electric motor includes a rotating shaft, a sleeve fitted to and mounted on the rotating shaft, permanent magnets and magnetic members arranged radially on an outer peripheral portion of the sleeve circumferentially alternately in close contact with each other, and a pair of side covers disposed on axially opposite side surfaces of the sleeve, each of the permanent magnets and each of the magnetic members, and holding the sleeve, permanent magnets and magnetic members while sandwiching the sleeve, permanent magnets and magnetic members in an axial direction. The sleeve and the pair of side covers are each formed of a nonmagnetic material such as austenitic stainless steel or an aluminum alloy. Each of the magnetic members is composed of a laminate of metal plates comprising a magnetic material, for example, electromagnetic steel sheets.

The sleeve is keyed to the rotating shaft, and thereby coupled thereto integrally. On an outer peripheral surface of the sleeve, there are formed grooves spaced in a circumferential direction and extending in an axial direction. At a radially inward position, corresponding to each of the grooves, in each of the magnetic members comprising the laminate of electromagnetic steel sheets, there is formed a protrusion extending radially inwardly. Each of the magnetic members is disposed such that the magnetic members cannot rotate relative to the sleeve coupled to the rotating shaft, because the protrusion of the magnetic member is fitted into the corresponding groove formed in the outer peripheral surface of the sleeve. Each of the magnetic members has a projection extending radially outwardly of each of the permanent magnets. In each of the projections, a flange portion extending circumferentially bilaterally outwardly is formed. In this condition, consider a state in which each of the magnetic members is disposed on the sleeve, and each of the permanent magnets is inserted into, and held in, a radial space formed in the circumferential direction of each of the magnetic members. In this state, a radially outward end of each of the permanent magnets is held by each of the flange portions opposed with spacing in the circumferential direction so that the permanent magnets will not escape radially outwardly. Between the pair of side covers, a plurality of through bolts are disposed in such a manner as to pass through one of the side covers, each of the magnetic members, and the other side cover. An end portion of each of the through bolts is clamped by a nut. As a result, each of the permanent magnets and magnetic members arranged on the outer peripheral portion of the sleeve coupled to the rotating shaft has the axially opposite side surfaces thereof squeezed between the pair of side covers, together with the sleeve, whereby the permanent magnets, magnetic members, and sleeve are connected together integrally with the rotating shaft. A radially outward end surface of each of the magnetic members is an arcuate surface of substantially the same shape. These radially outward end surfaces are positioned with spacing in the circumferential direction on a circular outer peripheral surface having the same axis center as the rotating shaft (i.e., the spacing formed between the adjacent flange portions opposed in the circumferential direction).

In the conventional rotor constituted as above, a stronger magnetic field for upgraded performance of a rotating machine has been obtained by applying means which make the radial length of each of the radially arranged permanent magnets as large as possible and also make the magnets multipolar. However, the following problems arise when the radial length of each of the permanent magnets is made as large as possible, and the number of the permanent magnets is maximally increased for multipolar function: The circumferential width of each of the magnetic members arranged so as to circumferentially alternate with each of the permanent magnets is excessively small. Moreover, the distance from the outer peripheral surface of each of the magnetic members to the radially inward end of each of the permanent magnets becomes large. Thus, magnetization after assembly becomes quite difficult. In recent years, the performance of permanent magnets has markedly improved, and small permanent magnets can provide a strong magnetic field. Hence, a strong magnetizing force is applied when imparting magnetism. If the circumferential width of each of the magnetic members is excessively small, saturation of the magnetic flux occurs during the magnetizing action after assembly, making it impossible to impart magnetism to each of the permanent magnets as desired. In addition, if the distance from the outer peripheral surface of each of the magnetic members to the radially inward end of each of the permanent magnets is large, it becomes more difficult for a magnetic flux to enter a portion nearer to the radially inward end of each of the permanent magnets. This makes it even more difficult to impart magnetism. The outcome is that despite the increased number of the permanent magnets for a multipolar function, the performance of the rotating machine, which is an electric generator or an electric motor, cannot be improved to a desired degree.

Furthermore, the foregoing conventional rotor is composed of many kinds of and a large number of components, such as the rotating shaft, the sleeve, the keys for coupling the rotating shaft and the sleeve, the plurality of permanent magnets, the plurality of magnetic members, the pair of side covers, and the plurality of through bolts and nuts. Besides, these varieties of many components have to be gathered and assembled. Consequently, the number of the components is large, and many man-hours are required for assembly. The assembly work is laborious, and the burden on labor is heavy. A relatively long assembly time is required, boosting the manufacturing cost as a whole.

SUMMARY OF THE INVENTION

An object of the present invention is to provide a novel rotor for a rotating machine, in which the number of permanent magnets is increased to form multipoles, and even after their integration, each of the permanent magnets can be magnetized fully reliably to improve performance.

Another object of the invention is to provide a novel rotor for a rotating machine, in which the number of permanent magnets is increased to form multipoles, and even after their integration, each of the permanent magnets can be magnetized fully reliably to improve performance; whose structure is simple and whose components are small in number; and which can be manufactured at a lower cost than in earlier technologies.

Still another object of the invention is to provide a novel rotor for a rotating machine, in which escape of each of permanent magnets can be prevented reliably, and even after the permanent magnets are integrated, each of them can be magnetized fully reliably to improve performance.

According to the invention, there is provided a rotor for a rotating machine, comprising a body portion having shaft means mounted therein substantially integrally, and being formed of a nonmagnetic material; and permanent magnets and magnetic members provided integrally with the body portion, and arranged radially and circumferentially alternately in intimate contact with each other; wherein the circumferential length between radially outward ends of circumferentially opposite side surfaces, of each of the magnetic members, in intimate contact with the adjacent permanent magnets, is set to be larger than the radial length of each of the permanent magnets.

Preferably, the circumferential length between the radially outward ends of the circumferentially opposite side surfaces of each of the magnetic members, in intimate contact with the adjacent permanent magnets, is set to be 1.5 to 2.0 times the radial length of each of the permanent magnets.

Preferably, the body portion has a substantially circular outer peripheral surface and opposite side surfaces, each of the permanent magnets being completely embedded in the body portion, and each of the magnetic members having only a radially outward end surface thereof exposed and having other surfaces thereof embedded in the body portion.

Preferably, each of the magnetic members has a projection extending radially outwardly of each of the permanent magnets, a space portion being formed in the circumferential direction by the adjacent projections outwardly of a radially outward end surface of each of the permanent magnets, the body portion being disposed so as to fill the space portions and a gap among radially inward side surfaces of each of the permanent magnets and each of the magnetic members, as well as an outer peripheral surface of the shaft means, and so as to cover axially opposite side surfaces of each of the permanent magnets and each of the magnetic members to a predetermined thickness, and the exposed radially outward end surface of each of the magnetic members being substantially coplanar with the outer peripheral surface of the body portion.

Preferably, on one or both of the circumferentially side surfaces of each of the permanent magnets in a radially outward portion thereof, a radially outward inclined surface extending linearly in a direction in which the opposite side surfaces approach each other toward a radially outward end thereof is formed until the outward end.

Preferably, on one or both of the circumferentially side surfaces of each of the permanent magnets in a radially inward portion thereof except the radially outward portion thereof, a radially inward inclined surface extending linearly in a direction in which the opposite side surfaces approach each other toward a radially inward end thereof is formed until the inward end, and the radially inward inclined surface is formed on the circumferentially side surface on the same side as the circumferentially side surface where the radially outward inclined surface has been formed.

Preferably, the length of the radially inward inclined surface in each of the permanent magnets is formed to be greater than the length of the radially outward inclined surface.

Preferably, the circumferential width of the radially inward portion except the radially outward portion in each of the permanent magnets is formed to be constant in an entire region of the radially inward portion.

DETAILED DESCRIPTION OF THE PREFERRED EMBODIMENTS

Figure 1:
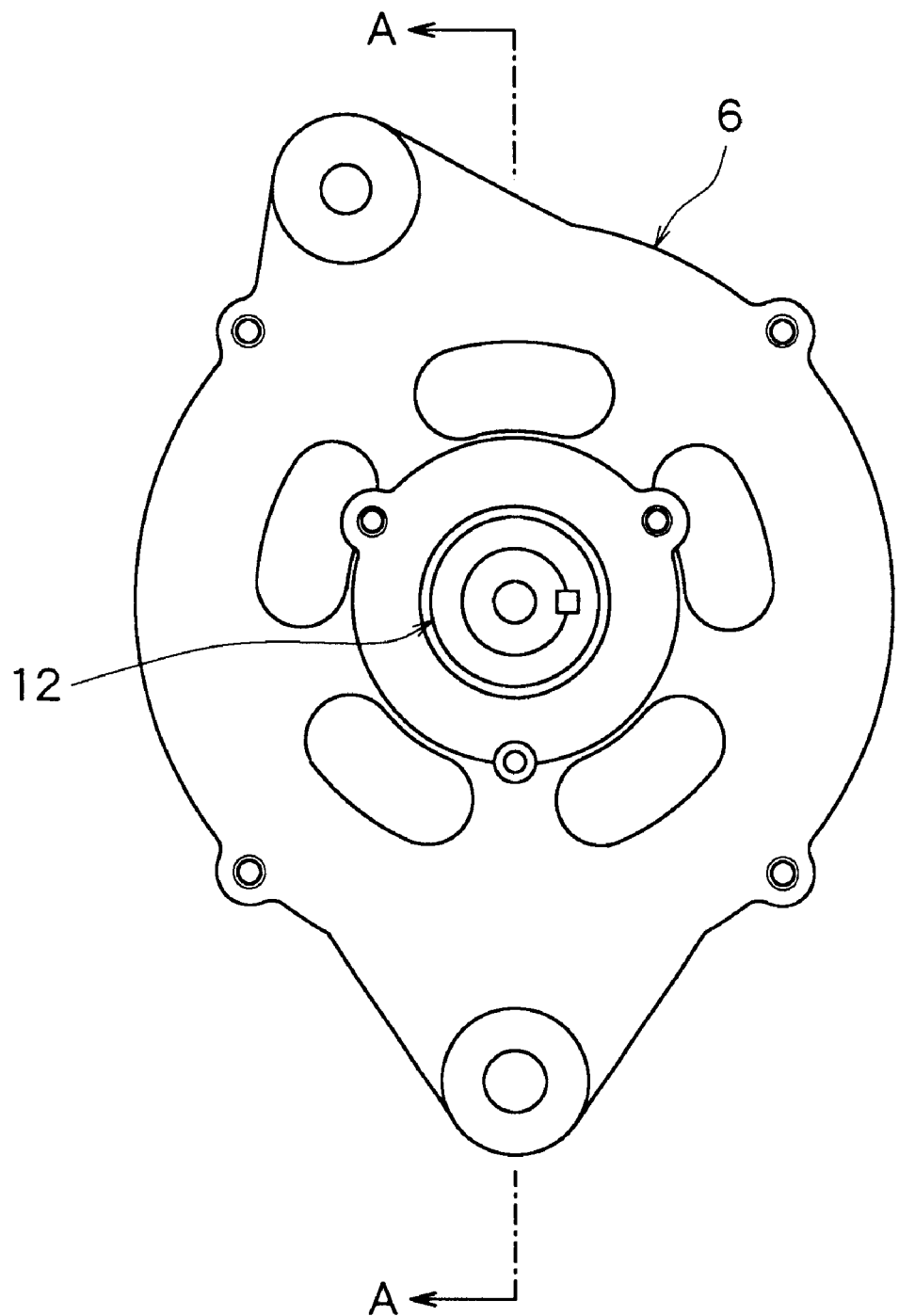
FIG. 1 is a side view of a rotating machine having a rotor in accordance with an embodiment of the present invention.

Preferred embodiments of the present invention will now be described in more detail with reference to the accompanying drawings. In FIGS. 1 to 19, substantially the same portions are shown by the same numerals. A rotating machine entirely indicated at the numeral 2, which is an electric generator, has a rotor 4, a pair of case members 6 and 8, and a stator 10, as shown in FIGS. 1 to 4. The rotor 4 is composed of a rotating shaft 12 integrally mounted via a sleeve 14, a plurality of permanent magnets 16, a plurality of magnetic members 18, and a body portion 20. Each of the permanent magnets 16 is completely embedded in the body portion 20, while each of the magnetic members 18 has only a radially outward end surface thereof exposed and has other surfaces thereof all embedded in the body portion 20.

Figure 2:
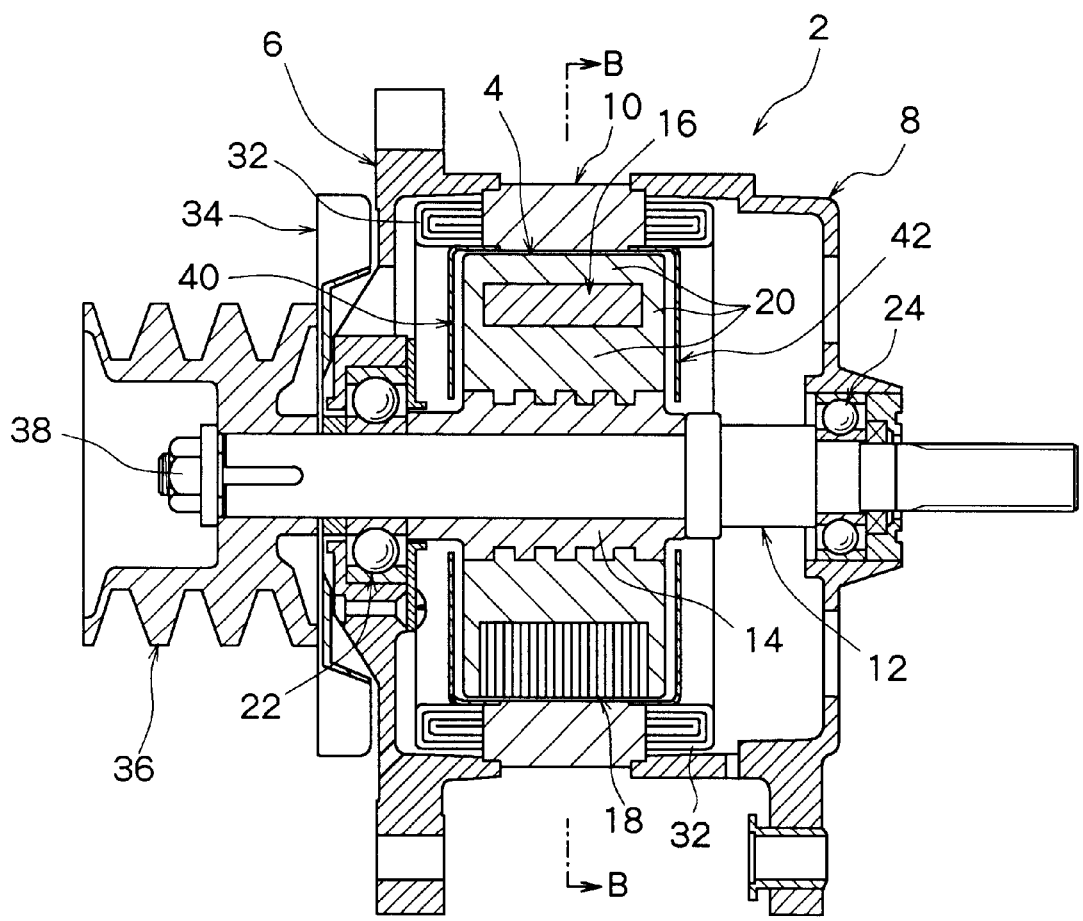
FIG. 2 is a sectional view taken on line A—A of FIG. 1.
Figure 3:
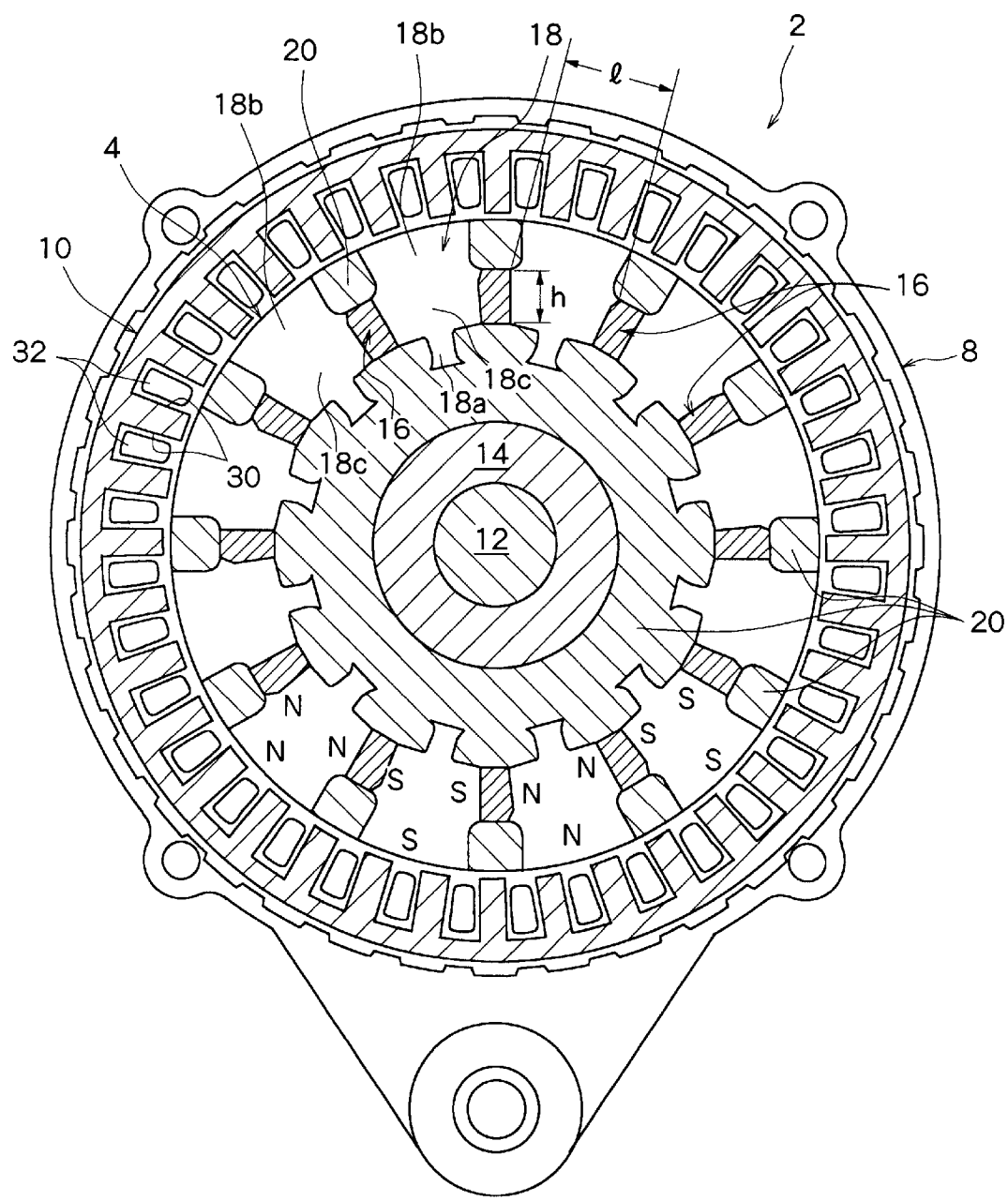
FIG. 3 is an enlarged sectional view taken on line B—B of FIG. 2.
Figure 4:
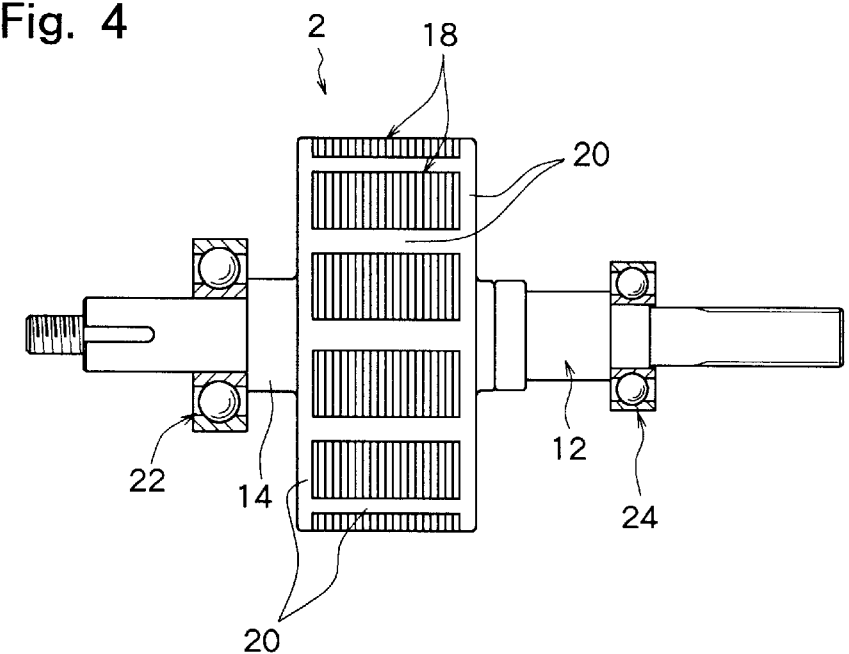
FIG. 4 is a plan view of the rotor having radial ball bearings assembled to a rotating shaft.

The configuration (completed configuration) of the rotor 4 according to the invention will be described more concretely. With reference to FIGS. 2 to 4, the body portion 20 comprises a nonmagnetic material such as an aluminum alloy or a zinc alloy, e.g., an aluminum alloy in the embodiments. As will be described later on, the body portion 20 has the sleeve 14, each of the permanent magnets 16, and each of the magnetic members 18 integrally embedded therein by die casting, and has an outer peripheral surface of a substantially circular shape, and opposite side surfaces extending perpendicularly to the axial direction. To the body portion 20, the sleeve 14 is integrally mounted. The sleeve 14 is positioned in such a manner as to have an axis center common to the axis of the outer peripheral surface of the body portion 20 and is disposed such that the entire outer peripheral surface of the sleeve, except its axially opposite end portions, is covered with the body portion 20. The rotating shaft 12 is press fitted into a through-hole 14a of the sleeve 14 (see FIG. 8), whereby the rotating shaft 12 is integrally mounted to the body portion 20 via the sleeve 14. In the present embodiment, the sleeve 14 and the rotating shaft 12 constitute shaft means, so that the shaft means is mounted to the body portion 20 substantially integrally. The length of the rotating shaft 12 is set such that the rotating shaft 12 protrudes from the opposite side surfaces of the body portion 20 axially outwardly by predetermined lengths.

In the body portion 20, the plurality of permanent magnets 16, and the plurality of magnetic members 18 are integrally embedded. Each of the permanent magnets 16 is substantially the same shape, and each of the magnetic members 18 is substantially the same shape. The permanent magnets 16, and the magnetic members 18 are disposed radially in the body portion 20 with equal pitches and circumferentially alternately and in intimate contact with each other. In this disposed state, the axially opposite side surfaces of each of the permanent magnets 16 and each of the magnetic members 18 are located on substantially the same planes. The wording "axial direction" means the axial direction common to the rotating shaft 12, sleeve 14, and body portion 20, accordingly, the axial direction of the rotor 4. Hereinbelow, "the axial direction," unless otherwise specified, is to mean the above direction.

Each of the magnetic members 18 formed of a magnetic material is composed of a laminate of a plurality of electromagnetic steel sheets having substantially the same shape, e.g., a laminate of a plurality of silicon steel sheets in the embodiment. Each of the magnetic members 18 has a radially outward end surface of an arcuate shape concentric with the rotating shaft 12, a radially inward end surface extending tangentially linearly, and circumferentially opposite side surfaces extending radially. In the circumferential center of the radially inward end surface, an escape-preventing protrusion 18a protruding radially inwardly is formed so as to extend in the axially entire region. A radially inward front end portion of each of the protrusions 18a fans out radially inwardly when viewed from the axial direction. When viewed axially, each of circumferentially opposed side surfaces of radially outward portions in the circumferentially opposite side surfaces is parallel to a straight line passing through the axis center and also passing through the circumferential center between the side surfaces, one of circumferentially opposed side surfaces of radially inward portions in the circumferentially opposite side surfaces is parallel to the straight line, and the other of the side surfaces forms a concave at an obtuse angle to the straight line. When viewed axially, the other side surface in the inward portion has the concave formed by two linear inclined surfaces. Between the circumferentially opposed side surfaces in the outward portions, a space portion (a body portion filling space portion) is formed which is a nearly square, rectangular shape when viewed axially. Between the circumferentially opposed side surfaces in the inward portions, a space portion (a permanent magnet inserting/holding space portion) of a generally rectangular shape is formed which has a radial length slightly larger than a circumferential width when viewed axially. Thus, in each of the permanent magnet inserting/holding space portions, the concave is formed so as to form a circumferential width greater than the circumferential width of each of the radially inward end and the radially outward end. The concave is formed in the radially outward portion of each of the permanent magnet inserting/holding space portions. The circumferential width of the body portion filling space portion is larger than the circumferential width (maximum width) of the permanent magnet inserting/holding space portion. At the radial boundary between both types of space portions, r-shaped stepped portions are formed.

The shape of each of the magnetic members 18 may be expressed in another manner. Each of the magnetic members 18 has a projection 18b extending radially outwardly of each of the permanent magnets 16 (see FIG. 3). Outwardly of the radially outward end surface of each of the permanent magnets 16, space portions to be filled with the body portion 20 (the body portion filling space portions) are formed in the circumferential direction by the respective projections 18b. Similarly, space portions for inserting and holding the permanent magnets 16 in intimate contact (the permanent magnet inserting/holding space portions) are formed circumferentially by respective portions 18c (see FIG. 3) radially inward of the projections 18b in the magnetic members 18. The shape of each of the permanent magnet inserting/holding space portions is, of course, in a shape matching the shape of the corresponding permanent magnet 16 so that the permanent magnet 16 to be described later on will be inserted in close contact and held there.

Figure 12:
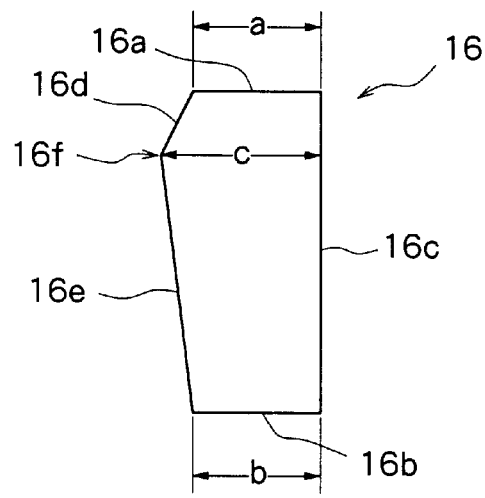
FIG. 12 is a side view of a permanent magnet disposed in the rotor.
Figure 13:
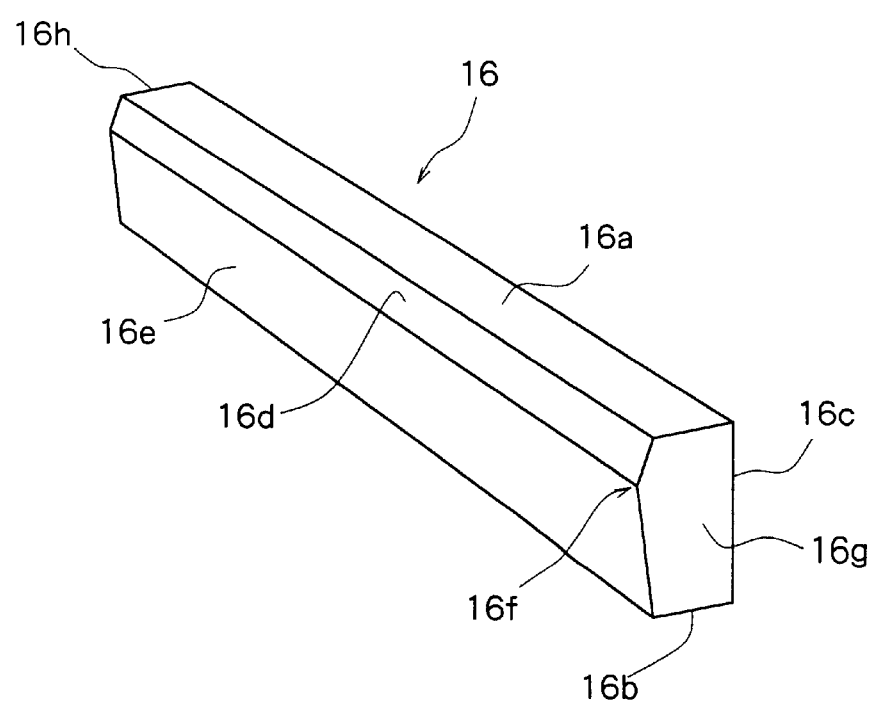
FIG. 13 is a perspective view of the permanent magnet shown in FIG. 12.

Each of the permanent magnets 16, for example, of the Nd—Fe—B type is inserted into and held in the above-described permanent magnet inserting/holding space portion, with the permanent magnet being in a non-magnetized state. As shown in FIGS. 12 and 13, each of the permanent magnets 16 is in the shape of an elongated, rectangular parallelopiped. However, as will be clear from the above description, one of the side surfaces of each of the magnetic members 18, which forms the permanent magnet inserting/holding space portion, extends linearly, while the other of the side surfaces forms an obtuse-angled concave formed by two inclined surfaces. Thus, both side surfaces of each of the permanent magnets 16 to be inserted are in a matching shape.

One of the permanent magnets 16 will be explained, on the assumption that each of the permanent magnets 16 has been mounted to the magnetic member 18. When viewed from a longitudinal direction consistent with the axial direction (namely, in FIG. 12), the permanent magnet 16 has one end surface 16a and the other end surface 16b spaced from each other and extending parallely and linearly, a side surface 16c extending linearly so as to intersect the one end surface 16a and the other end surface 16b perpendicularly, and the other side surface forming an obtuse-angled convex 16f from two linearly extending inclined surfaces 16d and 16e. One of the inclined surfaces, 16d, defines, in the circumferentially other side surface in a radially outward portion (the portion nearer to the one end surface 16a in FIG. 12) of the permanent magnet 16, a radially outward inclined surface 16d linearly extending in a direction in which the opposite side surfaces approach each other toward the one end surface 16a as the radially outward end. The radially outward inclined surface 16d reaches the one end surface 16a as the radially outward end. The other inclined surface 16e defines, in the circumferentially other side surface in a radially inward portion (the portion nearer to the other end surface 16b in FIG. 12) except the radially outward portion of the permanent magnet 16, a radially inward inclined surface 16e linearly extending in a direction in which the opposite side surfaces approach each other toward the other end surface 16b as the radially inward end. The radially inward inclined surface 16e reaches the other end surface 16b as the radially inward end. The radially outward inclined surface 16d and the radially inward inclined surface 16e together form the convex 16f at the boundary between the radially outward portion and the radially inward portion of the permanent magnet 16. The convex 16f has a circumferential width c greater than the circumferential width a of the one end surface 16a as the radially outward end, and the circumferential width b of the other end surface 16b as the radially inward end. The circumferential width of the permanent magnet 16 (the width in the right-and-left direction in FIG. 12) is set to become gradually smaller, starting at the site of formation of the convex 16f, toward the radially outward end (the one end surface 16a) and the radially inward end (the other end surface 16b). The length of the radially inward inclined surface 16e is greater than the length of the radially outward inclined surface 16d. In the following description, "the circumferential width" in the permanent magnet 16 may be simply called "the width".

One end surface 16g and the other end surface 16h in the longitudinal direction of the permanent magnet 16 each comprises a flat surface perpendicular to the one end surface 16a and the other end surface 16b. The cross-sectional shape of the permanent magnet 16 (substantially the same shape as the shape shown in FIG. 12) is set to be substantially the same over the distance from one end to the other end in the longitudinal direction. In the illustrated embodiment, when viewed longitudinally (in FIG. 12), the width a of the one end surface 16a and the width b of the other end surface 16b are set to be substantially the same, while the width c at the site of formation of the convex 16f (maximum width) is set to be greater than the width a and the width b (a=b<c). The length between end surface 16a and end surface 16b of the permanent magnet 16 (i.e., the length of the one side surface 16c) is set to be about twice the width of end surface 16a or end surface 16b whereas the longitudinal length of the permanent magnet 16 (the length between end surface 16g and end surface 16h) is set to be about 10 times the width of end surface 16a or end surface 16b.

With reference to FIGS. 2 to 4, each of the permanent magnets 16 constituted as described above is inserted into and held in the permanent magnet inserting/holding space portion between the adjacent magnetic members 18. When each of the permanent magnets 16 has been mounted between the adjacent magnetic members 18, the radially outward end surface (16a) of each of the permanent magnets 16 is located circumferentially on nearly the same level as each of the stepped portions which extends circumferentially and defines part of the body portion filling space portion. On the other hand, the radially inward end surface (16b) is located circumferentially on nearly the same level as the radially inward end surface of the magnetic member 18 which defines the radially inward end of the permanent magnet inserting/holding space portion.

The body portion 20 comprising an aluminum alloy, a nonmagnetic material, is disposed in such a manner as to fill the gap between the radially inward surfaces of each of the permanent magnets 16 and each of the magnetic members 18 and the outer peripheral surface of the sleeve 14 (the gap forms a substantially annular space) and the above body portion filling space portion, and also as to cover the axially opposite side surfaces of each of the permanent magnets 16 and each of the magnetic members 18 over a predetermined thickness. Such disposition can be easily performed by casting, preferably die casting. Each of the magnetic members 18 is formed such that only its radially outward end surface forms an exposed surface appearing from the body portion 20, and the radially outward end surface is substantially coplanar with the outer peripheral surface of the body portion 20. That is, each of the permanent magnets 16 and each of the magnetic members 18 are integrated by the body portion 20. Of them, each of the permanent magnets 16 is completely embedded in the body portion 20, while each of the magnetic members 18 has only its radially outward end surface exposed, and has the other surfaces thereof all embedded in the body portion 20. In other words, the radially outward end surfaces of the respective magnetic members 18 are exposed such that they are partitioned at circumferentially equal intervals by segments of the body portion 20 filled into the body portion filling space portions, and that the axially opposite side surfaces of each of the magnetic members 18 are covered with the body portion 20 over a predetermined thickness. Each of the non-magnetized permanent magnets 16 can be magnetized from the exposed surface of each of the magnetic members 18.

The respective magnetic members 18, in the completed form of the rotor 4 after molding, are arranged as discontinuous independent members separated from each other in the circumferential direction as stated above. Before molding, the magnetic members 18 are composed of a single magnetic material comprising a laminate of silicon steel sheets, in each of which the respective radially outward ends of the body portion filling space portions are connected together by arcuate thin bridge portions, whereby the entire outer peripheral edge makes a continuous circular shape. A single magnetic material comprising such silicon steel sheets is integrated with the sleeve 14 and each of the permanent magnets 16 by the body portion 20 to prepare an intermediate product of the rotor 4. Then, the intermediate product is cut so that the outer peripheral edge of the rotor 4 will be concentric with the sleeve 14 and, accordingly, the rotating shaft 12, whereby each of the bridge portions is removed. As a result, each of the segments of the body portion 20, which has been filled into the space portion radially inward of each of the bridge portions and whose radially outward surface has been covered with each of the bridge portions at the initial stage of molding, becomes exposed at the outer peripheral surface. Details of the method for producing the rotor 4 will be offered later on. The so processed intermediate product of the rotor 4 is brought to the finished form by press fitting the rotating shaft 12 into the sleeve 14.

Figure 8:
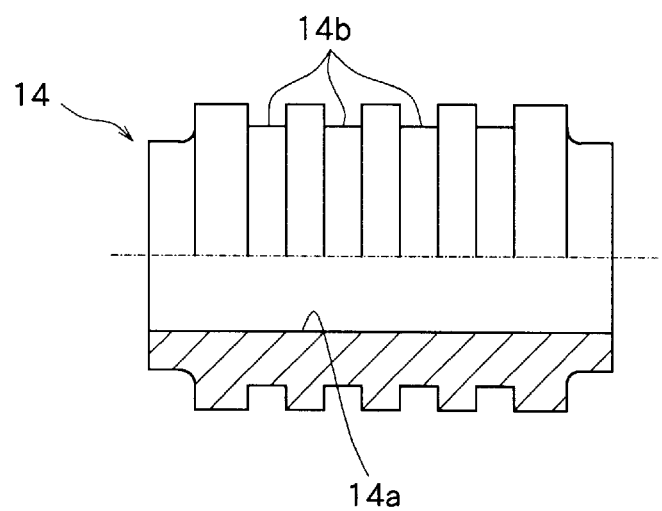
FIG. 8 is a side view of the sleeve, with its half relative to its axis being broken away.
Figure 11:
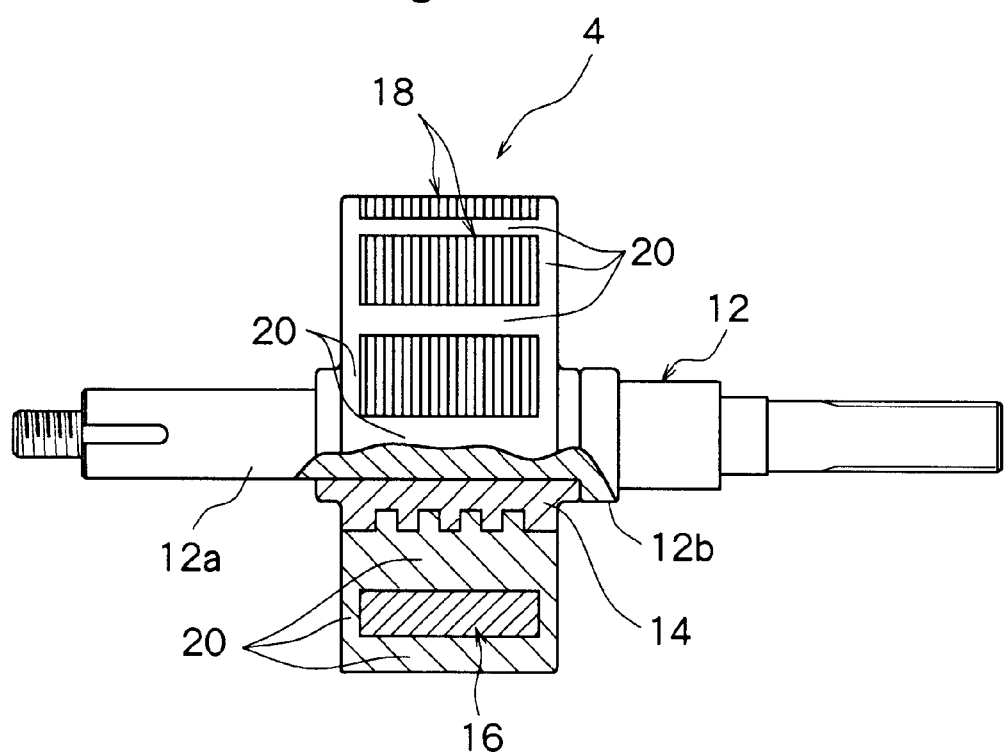
FIG. 11 is a view, partially broken away, of the rotor completed by mounting a rotating shaft to the intermediate product of the rotor illustrated in FIG. 10.

The method for producing the rotor 4 according to the invention configured as described above will be described in detail. The rotor 4, in the foregoing embodiment, is composed of the rotating shaft 12, the sleeve 14, the plurality of permanent magnets 16, the plurality of magnetic members 18, and the body portion 20. The members other than the body portion 20, whose molten metal material is poured into and pressurized in a mold (not shown) at the time of molding by die casting, are produced separately beforehand. Of them, the sleeve 14 has a through-hole 14a, and a plurality of annular grooves 14b formed with spacing in the axial direction on an outer peripheral surface of the sleeve, as shown in FIG. 8. When integral molding has been performed with the outer peripheral surface of the sleeve 14 being covered with the body portion 20, each of the annular grooves 14b is filled with a segment of the body portion 20. Thus, the axial escape of the sleeve 14 relative to the body portion 20 is reliably prevented. The rotating shaft 12, as shown in FIG. 11, has a press fittable portion 12a, having an outer diameter set so that the portion 12a can be press fitted into the through-hole 14a of the sleeve 14 from one side in the axial direction, and a large-diameter flange portion 12b provided at the other end of the press fittable portion 12a. The flange portion 12b has the function of a positioning stopper acting when the press fittable portion 12a is press fitted into the sleeve 14. Each of the permanent magnets 16 is formed by forming and sintering of a powder comprising a mixture of magnet materials, e.g., Nd, Fe and B, in predetermined proportions, by powder metallurgy, which may be a well known method per se, into the shape described earlier by reference to FIGS. 12 and 13. Each of the permanent magnets 16, in such a free state, has not been magnetized.

As explained previously, the respective magnetic members 18, in the finished form of the rotor 4 after molding (in the state molded as the intermediate product of the rotor 4 in the embodiment), are arranged as discontinuous independent members separated from each other in the circumferential direction. Before molding, the magnetic members 18 are composed of a single magnetic material comprising a laminate of silicon steel sheets, in each of which the respective radially outward ends of the respective body portion filling space portions are connected together by arcuate thin bridge portions, whereby the entire outer peripheral edge makes a continuous circular shape. After molding, the single magnetic material is separated into the respective magnetic members 18 as described above.

Figure 5:
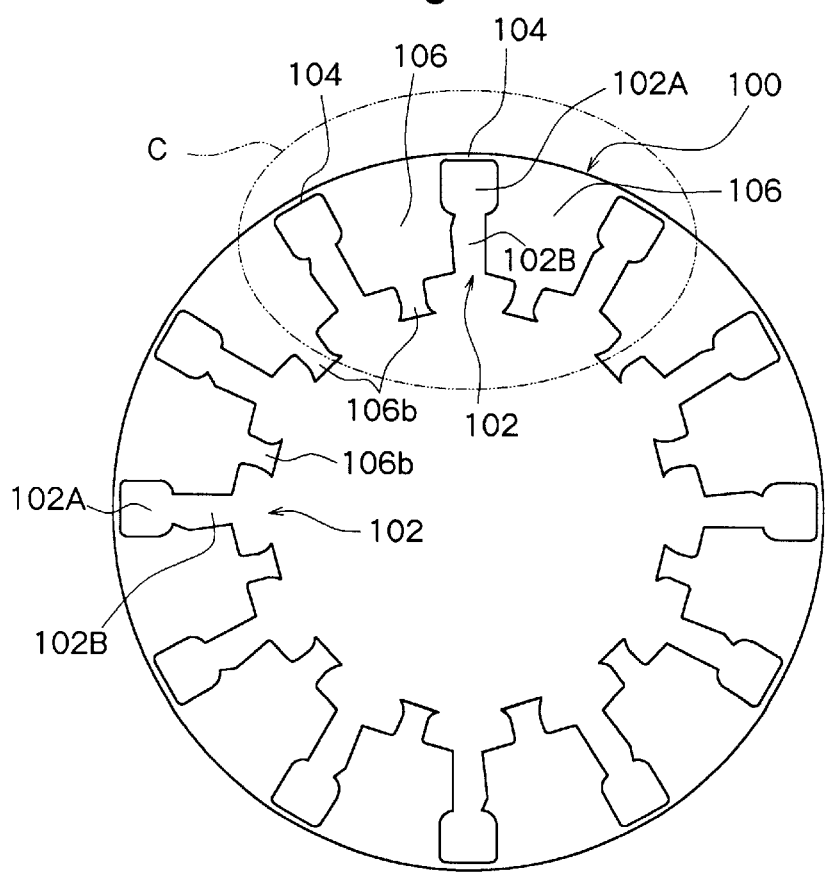
FIG. 5 is a plan view of an electromagnetic steel sheet for constituting magnetic members to be disposed in the rotor.
Figure 6:
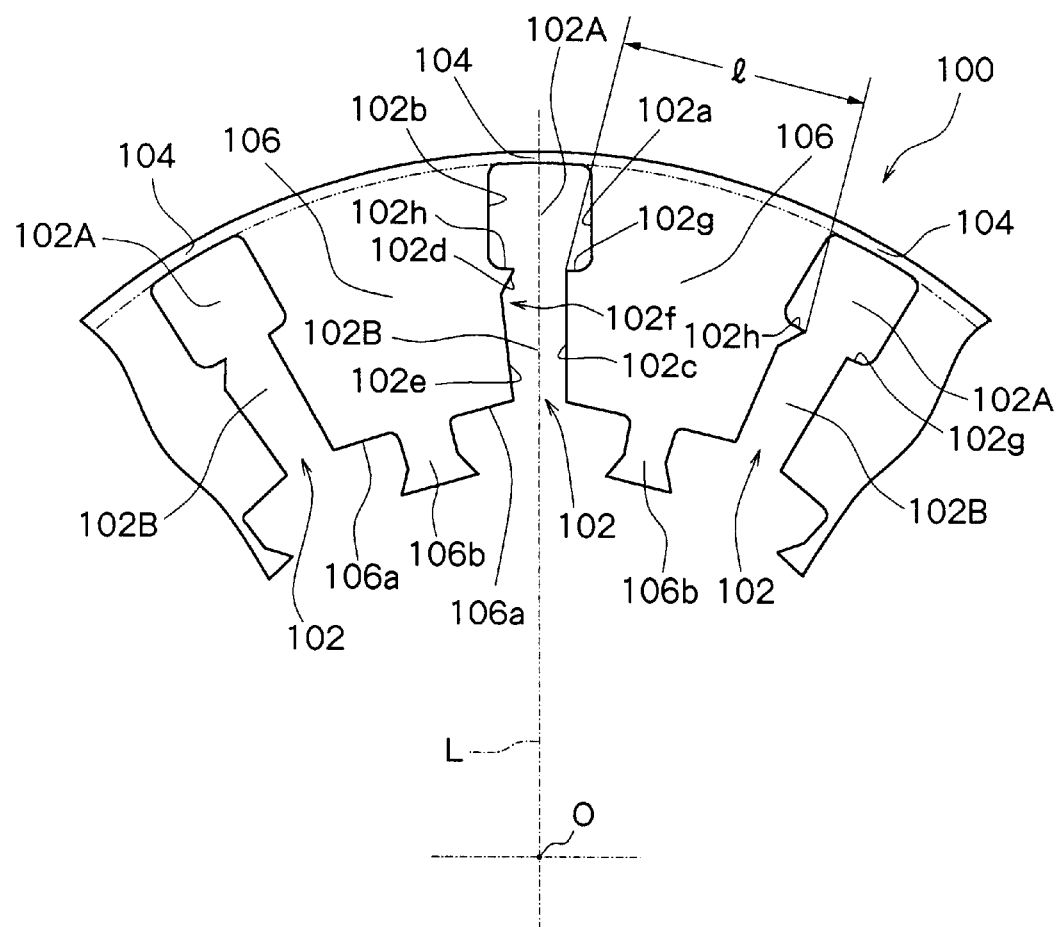
FIG. 6 is an enlarged view of portion C of FIG. 5.

With reference to FIGS. 5 and 6, the numeral 100 denotes a metal plate comprising a magnetic material, or a silicon steel sheet as an embodiment of an electromagnetic steel sheet in the embodiment. The silicon steel sheet 100 has a basic shape nearly like a plain washer as a whole, which has an entirely continuous circular outer peripheral surface, and has a through-hole formed radially inwardly. In the silicon steel sheet 100, a plurality of slots 102 are formed so as to be circumferentially spaced from each other and arranged radially with equal pitch. Each of the slots 102 formed in substantially the same shape has one end open at a radially inward end, accordingly, in a portion defining an outer peripheral edge of the through-hole, and has the other end closed, with an arcuate bridge portion 104 concentric with an axis center O of the silicon steel sheet 100 being left between the other end and the outer peripheral surface. When viewed axially, each of circumferentially opposed side surfaces 102a and 102b of radially outward portions in each of the slots 102 extends linearly parallel to a straight line L passing through the axis center O of the silicon steel sheet 100 and also passing through the circumferential center between the side surfaces 102a and 102b, one of circumferentially opposed side surfaces, 102c, of radially inward portions extends linearly parallel to the straight line L, and the other of the side surfaces forms a concave 102f at an obtuse angle to the straight line L by two inclined surfaces 102d and 102e extending linearly.

Between the side surfaces 102a and 102b in the outward portions in each of the slots 102, a space portion (the aforementioned body portion filling space portion) 102A is formed which is in a nearly square, rectangular shape when viewed axially. Between one of the side surfaces, 102c, in the inward portions and the other of the side surfaces, 102d and 102e, a space portion (the aforementioned permanent magnet inserting/holding space portion) 102B of a generally rectangular shape is formed which has a radial length slightly larger than a circumferential width when viewed axially. The circumferential width of the body portion filling space portion 102A is larger than the circumferential width (maximum width defined by the site of presence of the concave 102f) of the permanent magnet inserting/holding space portion 102B. At the radial boundary between both types of space portions 102A and 102B, stepped portions 102g and 102h including an r-shape are formed. The concave 102f is formed in a radially outward part of the permanent magnet inserting/holding space portion 102B, and its circumferential width is greater than the circumferential width at the radially outward end and inward end of the space portion 102B. The circumferential width of the space portion 102B becomes gradually small from the site of formation of the concave 102f toward a radially outward region and a radially inward region. In the two inclined surfaces 102d and 102e forming the concave 102f, the length of the inclined surface 102e located radially inwardly is larger than the length of the inclined surface 102d located radially outwardly. The space portion 102B in each of the slots 102 has substantially the same shape as the aforementioned cross-sectional shape of the permanent magnet 16 (see FIG. 12) (more strictly, the permanent magnet 16 is larger than the space portion 102B by an amount to be press fitted).

Since the slots 102 are formed in the silicon steel sheet 100, bases 106 circumferentially spaced from each other by the slots 102 and radially arranged with equal pitch are formed in the silicon steel sheet 100. The radially inward end 106a of each of the bases 106 formed to have substantially the same shape (the radially inward end defining a part of the outer peripheral edge of the through-hole of the silicon steel sheet 100) extends linearly in a direction tangential to the through-hole. In the circumferential center of the radially inward end 106a of each of the bases 106, an escape-preventing protrusion 106b protruding radially inwardly is formed. A radially inward front end portion of each of the protrusions 106b fans out radially inwardly when viewed from the axial direction.

The so constituted silicon steel sheet 100 can be easily formed by punching a flat sheet by means of a press. A plurality of silicon steel sheets 100 formed by punching (e.g., 40 silicon steel sheets 100 1.0 mm thick) are aligned and laminated to form a magnetic material 180 of a substantially cylindrical shape having a circular outer peripheral surface, having the slots 102 arranged radially with spacing in the circumferential direction, the slot having one end radially inwardly open and the other end closed, with the arcuate bridge portion 104 being left between the other end and the outer peripheral surface, namely, the magnetic material 180 being a laminate of plural silicon steel sheets 100 (see FIG. 7). To hold the magnetic material 180 integrally as a laminate of silicon steel sheets 100, it is preferred to apply a suitable fixing means, such as stake or welding, on the outer peripheral surface of each of the silicon steel sheets 100.

Figure 7:
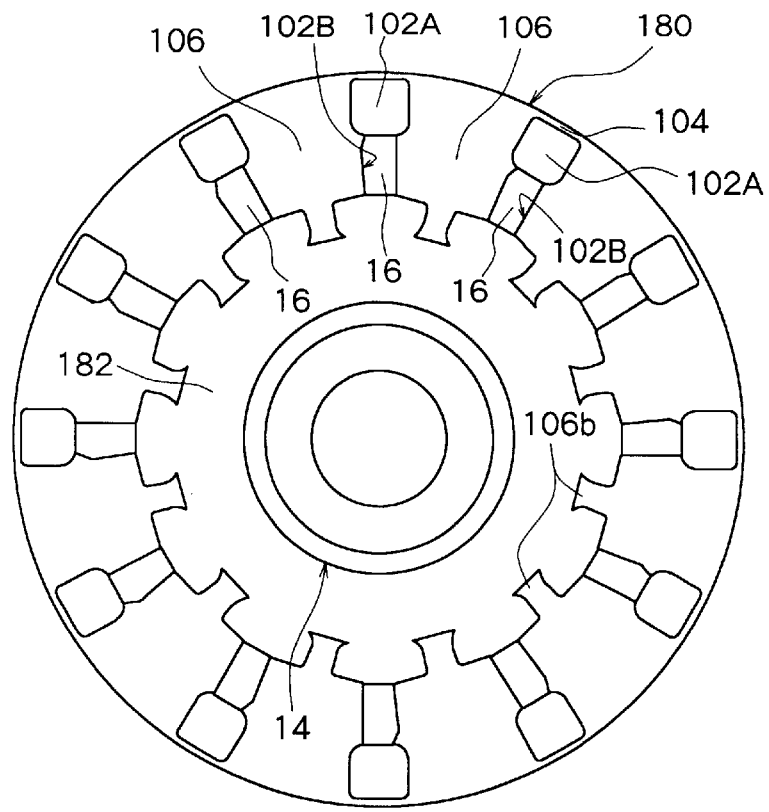
FIG. 7 is a view showing, from an axial direction, a sleeve disposed on an axis center in common with the axis center of a magnetic material of a laminate of the electromagnetic steel sheets illustrated in FIG. 5.

After formation of the magnetic material 180 by lamination of the silicon steel sheets 100, the permanent magnet 16 in a non-magnetized state is inserted into and held in the permanent magnet inserting/holding space portion 102B in each of the slots 102 such that the body portion filling space portion 102A is left between the permanent magnet inserting/holding space portion 102B and the bridge portion 104 (see FIG. 7). Insertion of each of the permanent magnets 16 into the corresponding space portion 102B is performed by press fitting in the embodiment. With reference to FIG. 7, the permanent magnet 16 is inserted into and held in each of the slots 102 of the magnetic material 180, whereafter the sleeve 14 is set in alignment with the axis center of the magnetic material 180. The concentrical setting of the magnetic material 180 and the sleeve 14 is carried out in a mold (not shown) for die casting. An annular space portion (body portion filling space portion) 182 is formed between the radially inward site of the magnetic material 180 and the permanent magnets 16 and the outer peripheral surface of the sleeve 14.

Then, die casting, which may employ a well known method per se, is performed by pouring a molten aluminum alloy, a nonmagnetic material, into a mold under pressure. That is, the molten aluminum alloy is filled into each of the body portion filling space portion 182 between the magnetic material 180 and each of the non-magnetized permanent magnets 16 and the sleeve 14 and into each of the body portion filling space portions 102A. Also, the axially opposite side surfaces of the magnetic material 180 and each of the permanent magnets 16 are covered with the aluminum alloy to a predetermined thickness. The sleeve 14, the magnetic material 180, and each of the permanent magnets 16 are thus integrally cast into the resulting body portion 20 (see FIGS. 2 and 3). The so integrally molded intermediate product of the rotor 4 is withdrawn from the mold and then cooled. The outer peripheral surfaces of the body portion 20 and the magnetic material 180 are then cut about the axis center of the sleeve 14 to cut off each of the bridge portions 104 (see FIGS. 9 and 10). The so cut outer peripheral surface of the intermediate product of the rotor 4 is formed coaxially with the sleeve 14. In FIG. 6, an arcuate portion shown by a two dot chain line represents a cut-scheduled surface to be cut by the above cutting operation. This cutting margin is provided to a degree to which at least each of the bridge portions 104 of the magnetic material 180 is completely cut.

Figure 9:
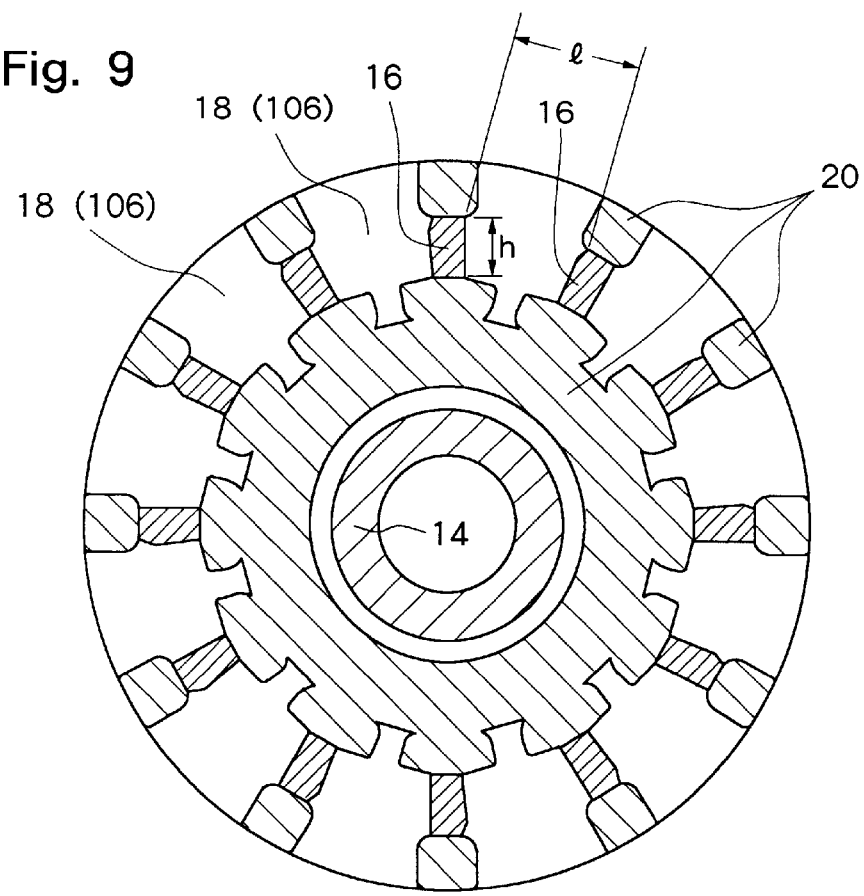
FIG. 9 is a sectional view showing, from an axial direction, an outer peripheral surface of an intermediate product of the rotor (an intermediate product of the rotor having no rotating shaft mounted therein) molded by die casting as in FIG. 7 having been partially removed by cutting.
Figure 10:
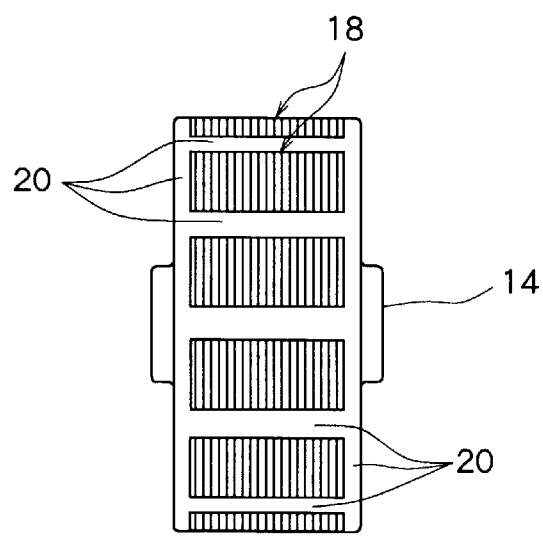
FIG. 10 is a view of the intermediate product of the rotor illustrated in FIG. 9, as viewed from a radially outward direction.

With reference to FIGS. 9 and 10, as a result of the above cutting operation, segments of the body portion 20, which have been filled into the space portions 102A radially inward of the bridge portions 104 and whose radially outward surfaces were covered with the bridge portions 104 initially at the time of molding, are exposed at the outer peripheral surface. As a result of the cutting, moreover, the magnetic material 180 composed of the laminate of the silicon steel sheets 100 is converted into a plurality of magnetic members 18 separated from each other circumferentially (corresponding to the bases 106 before separation), and the radially outward end surface of each of the magnetic members 18 forms an exposed surface appearing from the body portion 20 and is located substantially coplanar with the outer peripheral surface of the body portion 20.

As shown in FIGS. 3 and 9, in a state in which the permanent magnets 16 are molded integrally with the body portion 20 together with the magnetic members 18, it is important that the circumferential length l between radially outward ends of the circumferential opposite side surfaces of each of the magnetic members 18 in intimate contact with the permanent magnets 16 (the circumferential length l in circumferential opposite side surfaces of each of the bases 106 and between the corners defining the boundary between the space portions 102B and 102A as shown in FIG. 6) be greater than the radial length h of each of the permanent magnets 16 (the length between one end surface 16a and the other end surface 16b when viewed longitudinally as shown in FIG. 12). These dimensions vary with the intensity of the magnetic force and the circumferential thickness of the permanent magnet 16 after magnetization. It is preferred to set the dimensions at about l/h=1.5 to 2.0 for the purpose of practically increasing the magnetizability to be described later on.

Then, if necessary, the axially opposite side surfaces of the intermediate product of the rotor 4 are cut. Then, the rotating shaft 12 is press fitted into the sleeve 14 in the intermediate product of the rotor 4 to complete the configuration (constitution) of the rotor 4 (see FIG. 11). Then, rotation balancing of the rotor 4 is performed, whereafter magnetism is imparted from the exposed surface, being the outer peripheral surface of each of the magnetic members 18, to each of the non-magnetized permanent magnets 16 embedded in the body portion 20. The magnetism is applied to each of the exposed surfaces of the magnetic members 18 by a magnetizing device (not shown) so as to produce a circumferentially heteropolar arrangement (N-S). As a result, magnetization is performed on the circumferentially opposite side surfaces (one of the side surfaces, 16c, and the remaining side.

As clear from the foregoing description, the rotor 4 of the rotating machine 2 according to the present invention is composed of the body portion 20 comprising a nonmagnetic material and having the sleeve 14 and the rotating shaft 12 (constituting the shaft means) substantially integrally mounted thereto, and the permanent magnets 16 and magnetic members 18 provided integrally with the body portion 20 and radially arranged circumferentially alternately in intimate contact with each other. The circumferential length l between the radially outward ends in the circumferentially opposite side surfaces of each of the magnetic members 18 in intimate contact with the permanent magnets 16 is greater than the radial length h of each of the permanent magnets 16. Because of this constitution, the radial length h of each of the permanent magnets 16 is shortened as the performance of the permanent magnet 16 improves. Also, the circumferential distance l of each of the magnetic members 18 sandwiched by the permanent magnets 16 in intimate contact can be fully secured. Thus, even when a strong magnetizing force is applied to each of the permanent magnets 16 from the radially outward end surface of each of the magnetic members 18, magnetization can be achieved without causing magnetic saturation in each of the magnetic members 18. Consequently, the number of the permanent magnets 16 can be increased for multipolar action. Even after integration, the whole of each of the permanent magnets 16 can be fully reliably magnetized. The high performance characteristics of the permanent magnet 16 can be fully utilized to upgrade the performance of the rotating machine 2.

If the circumferential length l between the radially outward ends in the circumferentially opposite side surfaces of each of the magnetic members 18 in intimate contact with the permanent magnet 16 is set at 1.5 to 2.0 times the radial length h of each of the permanent magnets 16, magnetization can be effectively performed for practical use. If the circumferential length l is excessively long, magnetizability of each of the permanent magnets 16 declines. To improve this magnetizability, a larger magnetizing device has to be used, resulting in a cost increase. Also, the number of permanent magnets 16 is decreased, lowering the performance of the rotating machine 2. If the circumferential length l is excessively short, magnetic flux saturation occurs during the magnetizing action as in a conventional rotor, making it impossible to magnetize each of the permanent magnets 16 as desired. When the circumferential length l is set at 1.5 to 2.0 times the radial length h, these disadvantages can be avoided in practical use, although the theory behind this is not necessarily clear. Thus, fully effective magnetization can be performed to improve the performance of the rotating machine 2.

The rotor 4 of the rotating machine 2 according to the present invention, as stated earlier, is composed merely of the sleeve 14 and the rotating shaft 12 constituting the shaft means, the body portion 20, the plurality of permanent magnets 16, and the plurality of magnetic members 18. Thus, the rotor 4 does not require many kinds of and large numbers of components as in the conventional rotor, but is comprised of a minimum of necessary components alone, so that its structure is simple and its number of components is small. Consequently, the rotor can be produced at a lower cost than before. Moreover, each of the permanent magnets 16 is completely embedded in (sealed up in) the body portion 20, thus obviating the need to apply a surface treatment for antioxidation. In this respect as well, a cost decrease can be achieved. Furthermore, because of the configuration of the rotor, each of the permanent magnets 16 and each of the magnetic members 18 can be molded integrally with the body portion 20 by casting, such as die casting. Therefore, it is not necessary to gather and assemble many types of and large numbers of components as in conventional rotors. This makes production very easy and can shorten the manufacturing time. As a result, manufacturing at a lower cost than before can be performed. Besides, the shape of the permanent magnet 16 is relatively simple, and its production is also relatively easy.

In the rotor 4 of the rotating machine 2 according to the invention, the body portion 20 has a substantially circular outer peripheral surface and both side surfaces. Each of the permanent magnets 16 is completely embedded in the body portion 20, while each of the magnetic members 18 has only the radially outward end surface exposed, and has the other surfaces embedded in the body portion 20. In the case of this configuration, the rotor is simple in structure as a whole, easy to produce, and can be manufactured at a low cost. In the rotor 4 of the rotating machine 2 according to the invention, each of the magnetic members 18 has the projection 18b extending radially outwardly of each of the permanent magnets 16. Outwardly of the radially outward end surface of each of the permanent magnets 16, the space portion 102A is formed circumferentially by the adjacent projections 18b. The body portion 20 is disposed so as to fill the gap between the radially inward surfaces of each of the permanent magnets 16 and each of the magnetic members 18 and the outer peripheral surface of the shaft means 14 (i.e. the gap 182), also fill the space portions 102A, and further cover the axially opposite side surfaces of each of the permanent magnets 16 and each of the magnetic members 18 over a predetermined thickness. The exposed radially outward end surface of each of the magnetic members 18 is substantially coplanar with the outer peripheral surface of the body portion 20. This configuration makes it practically easy and possible to manufacture the rotor at a lower cost than conventional rotors. In the rotor 4 of the rotating machine 2 according to the invention, when the body portion 20 is filled into each of the space portions A, radially outward escape of each of the permanent magnets 16 can be prevented reliably, and magnetic shielding between the radially outward end surfaces of each of the magnetic members 18 can be performed fully reliably.

In the rotor 4 of the rotating machine 2 according to the invention, on one of the circumferentially side surfaces in the radially outward portion of each of the permanent magnets 16, the radially outward inclined surface 16d linearly extending in a direction in which the opposite side surfaces approach each other toward the radially outward end (the one end surface 16a) is formed until the radially outward end. In this case, when the permanent magnets 16 have been disposed integrally with the body portion 20 in such a manner as to contact each of the magnetic members 18 circumferentially intimately, radially outward escape of each of the permanent magnets 16 (escape during assembly to the silicon steel sheet 100 and during rotation of the rotor 4) can be prevented reliably. Substantially the same action and effect can be obtained, needless to say, when the radially outward inclined surface 16d is formed on the other of the circumferentially side surfaces of each of the permanent magnets 16, instead of on one of the circumferentially side surfaces.

In the rotor 4 of the rotating machine 2 according to the invention, on one of the circumferentially side surfaces in the radially inward portion except the radially outward portion of each of the permanent magnets 16, the radially inward inclined surface 16e linearly extending in a direction in which the opposite side surfaces approach each other toward the radially inward end (the other end surface 16b) is formed until the radially inward end. The radially inward inclined surface 16e is formed on the circumferentially side surface on the same side as the circumferentially side surface where the radially outward inclined surface 16d has been formed (in the embodiments shown in FIGS. 12 and 13, the side surface on the side opposite to the circumferentially side surface 16c). In this case, when the permanent magnets 16 have been disposed integrally with the body portion 20 in such a manner as to contact each of the magnetic members 18 circumferentially intimately, radially outward and inward escape of each of the permanent magnets 16 (escape during assembly to the silicon steel sheet 100 and during rotation of the rotor 4) can be prevented reliably. Furthermore, the two inclined surfaces 16d and 16e guide the magnetic flux so that it is passed easily, thus improving magnetizability. The radially inward inclined surface 16e is formed in the radially inward portion of each of the permanent magnets 16, which is distant from the radially outward end surface of each of the magnetic members 18. This configuration enables magnetization to be performed fully satisfactorily for a portion near the radially inward end (other end surface 16b) which is most distant from the radially outward end surface (one end surface 16a) of each of the magnetic members 18. Substantially the same action and effect can be obtained, needless to say, when the radially outward inclined surface 16d and the radially inward inclined surface 16e are formed on the other of the circumferentially side surfaces of each of the permanent magnets 16, instead of on one of the circumferentially side surfaces.

In the rotor 4 of the rotating machine 2 according to the invention, the length of the radially inward inclined surface 16e in each of the permanent magnets 16 is greater than the length of the radially outward inclined surface 16d. In this case, the above-described escape-preventing effect, and the magnetizability improving effect can be achieved practically easily and reliably.

With reference to FIGS. 1 to 4, radial ball bearings (hereinafter referred to simply as "bearings") 22 and 24 are press fitted and mounted on outward projections, beyond both side walls of the body portion 20, of the rotating shaft 12 in the rotor 4 manufactured as above. On axially opposite sides of the body portion 20 of the rotor 4, a pair of case members 6 and 8 are supported relatively rotatably on the rotating shaft 12 via the bearings 22 and 24. The case members 6 and 8 have through-holes, which are press fitted with the bearings 22 and 24, whereby the case members 6 and 8 are supported relatively rotatably on the rotating shaft 12. The pair of case members 6 and 8 have ventilation holes. Between the pair of case members 6 and 8, the stator 10 is mounted in such a manner as to cover the outer peripheral surface of the rotor 4 with a gap provided therebetween. The stator 10 of a nearly cylindrical shape is integrally molded from a magnetic material, such as an iron material or a steel material. In the stator 10, slots 30 extending axially are formed with spacing in the circumferential direction. A winding 32 comprising a bundle of copper wires is inserted into and held in each of the slots 30. On the stator 10, dust covers 40 and 42 are mounted for covering an outer surface portion of the rotor 4 which is not covered with the stator 10. The dust covers 40 and 42 are formed from heat resistant synthetic resin, and can block magnetic leaks from the permanent magnets 16 and prevent dust, such as iron powder, from being attracted and sucked into the rotor 4, etc. To an end portion of the rotating shaft 12, a cooling fan 34 and a pulley for rotational driving are integrally mounted by a bolt 38. The pulley 36 is drivingly connected to a drive source, for example, a crankshaft of an engine, via a V-belt and other power transmission means (not shown). In the so constituted rotating machine 2 as an electric generator, when the engine is actuated, the rotor 4 is rotationally driven by the power transmission means, pulley 36 and rotating shaft 12. Thus, an electric current is produced in the windings 32 disposed in the stator 10 to generate electric power. When the engine is stopped, the rotation of the rotor 4 is stopped to terminate electric power generation.

Figure 14:
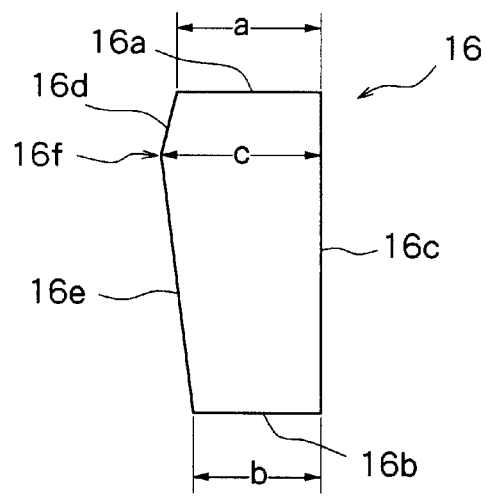
FIG. 14 is a side view, like FIG. 12, showing another embodiment of the permanent magnet.

FIG. 14 shows another embodiment of the permanent magnet 16. In this embodiment, the width a of one end surface 16a is greater than the width b of the other end surface 16b. The width at the site where the convex 16f is formed (i.e. maximum width) c is set to be greater than the widths a and b (b<a<c). The other constitutions are substantially the same as in the embodiment shown in FIGS. 12 and 13, and can achieve substantially the same action and effect as in that embodiment.

Figure 15:
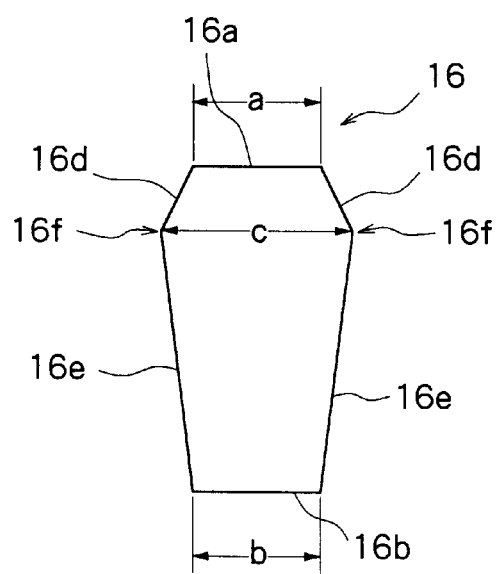
FIG. 15 is a side view, like FIG. 12, showing still another embodiment of the permanent magnet.

FIG. 15 shows still another embodiment of the permanent magnet 16. In this embodiment, a convex 16f comprising two inclined surfaces 16d and 16e is formed in each of opposite side surfaces of the permanent magnet 16. Each of the inclined surfaces 16d defines, in one and the other of circumferentially side surfaces in a radially outward portion of the permanent magnet 16, each of radially outward inclined surfaces 16d linearly extending in a direction in which the opposite side surfaces approach each other toward the one end surface 16a as the radially outward end. Each of the radially outward inclined surfaces 16d reaches the one end surface 16a as the radially outward end. Each of the inclined surfaces 16e defines, in one and the other of circumferentially side surfaces in a radially inward portion except the radially outward portion of the permanent magnet 16, each of radially inward inclined surfaces 16e linearly extending in a direction in which the opposite side surfaces approach each other toward the other end surface 16b as the radially inward end. Each of the radially inward inclined surfaces 16e reaches the other end surface 16b as the radially inward end. Each of the radially outward inclined surfaces 16d and each of the radially inward inclined surfaces 16e together form the convex 16f at the boundary between the radially outward portion and the radially inward portion of the permanent magnet 16. The width a of the one end surface 16a and the width b of the other end surface 16b are set to be substantially the same, while the width at the site of formation of each convex 16f (i.e. maximum width) c is set to be greater than the width a and the width b (a=b<c). The width of the permanent magnet 16 is set to become gradually smaller, starting at the site of formation of the convex 16f, toward the radially outward end (one end surface 16a) and the radially inward end (the other end surface 16b). The length of the radially inward inclined surface 16e is greater than the length of the radially outward inclined surface 16d. When viewed in the axial direction (in FIG. 15), the permanent magnet 16 is formed to be bilaterally symmetrical in FIG. 15 with respect to a virtual center line extending radially (vertically in FIG. 15) at the circumferential center. The embodiment shown in FIG. 15, compared with the previous two embodiments, can achieve a more stable escape-preventing effect against radially inward and outward escape, and enables balanced magnetization to be performed from the circumferentially opposite surfaces, thus further improving magnetizability.

Figure 16:
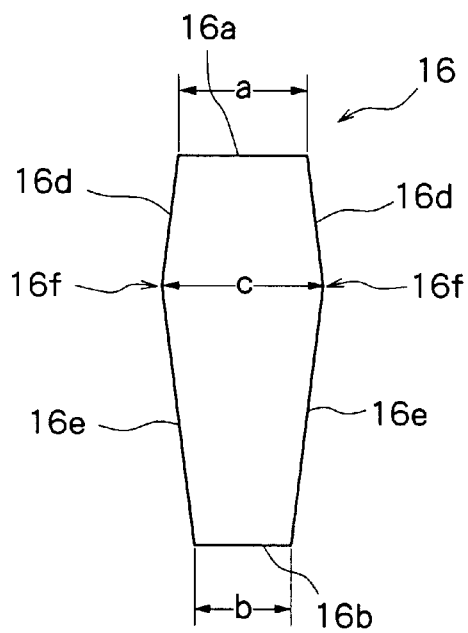
FIG. 16 is a side view, like FIG. 12, showing a further embodiment of the permanent magnet.

FIG. 16 shows a further embodiment of the permanent magnet 16. In this embodiment, like the embodiment shown in FIG. 15, radially outward inclined surfaces 16d and radially inward inclined surfaces 16e are formed on circumferentially opposite side surfaces. However, the site of formation of each of convexes 16f is slightly nearer to the radial center than in the embodiment shown in FIG. 15. The width a of one end surface 16a is greater than the width b of the other end surface 16b, and the width at the site of formation of each convex 16f (i.e. maximum width) c is set to be greater than the width a and the width b (b<a<c). The other basic constitution is substantially the same as in the embodiment shown in FIG. 15. In the present embodiment, too, substantially the same action and effect as in the embodiment shown in FIG. 15 can be obtained.

Figure 17:
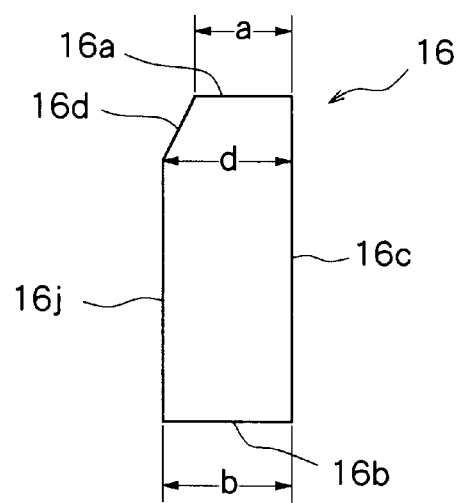
FIG. 17 is a side view, like FIG. 12, showing a still further embodiment of the permanent magnet.

FIG. 17 shows a still further embodiment of the permanent magnet 16. In this embodiment, a radially outward inclined surface 16d is formed in one of circumferentially side surfaces in a radially outward portion, and the width of a radially inward portion except the radially outward portion is constant over the entire region of the radially inward portion. In FIG. 17, the numeral 16j represents another side surface in the radially inward portion, and this side surface 16j extends parallel to one side surface 16c. The width d of the radially inward portion is substantially equal to the width b of the other end surface 16b, while the width a of one end surface 16a is set to be smaller than the width d of the radially inward portion and the width b of the other end surface 16b (d=b>a). The basic configuration of the permanent magnet 16 shown in FIG. 17 is such that the cross section of the permanent magnet 16 is rectangular, and the radially outward inclined surface 16d is formed at one corner of the radially outward end portion. Thus, the entire constitution is simpler than in the previous embodiments shown in FIGS. 12 to 16. Thus, the rotor having this embodiment is manufactured more easily and at a lower cost than in the previous embodiments. The effect of preventing radially outward escape of the permanent magnet 16 (escape during assembly to the silicon steel sheet 100 and during rotation of the rotor 4) is substantially the same as in the embodiments shown in FIGS. 12 to 14. The effect of preventing radially inward escape during assembly to the silicon steel sheet 100 is inferior to that of the embodiments shown in FIGS. 12 to 14. However, this weakness can be compensated for by assembling the permanent magnet to the silicon steel sheet 100 by press fitting, and does not pose a problem in practical use. In the present embodiment, substantially the same action and effect are obtained even when forming the radially outward inclined surface 16d not on one of the circumferential side surfaces, but on the other of the circumferential side surfaces (the right-hand surface in FIG. 17).

Figure 18:
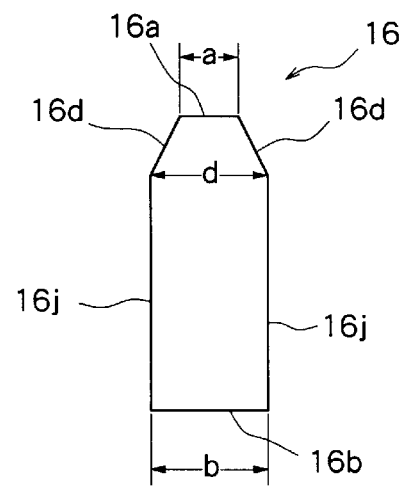
FIG. 18 is a side view, like FIG. 12, showing an additional embodiment of the permanent magnet.

FIG. 18 shows an additional embodiment of the permanent magnet 16. This embodiment is constituted by forming a radially outward inclined surface 16d additionally on one side surface 16c of the permanent magnet 16 shown in FIG. 17 such that the radially outward inclined surfaces 16d on both sides are circumferentially symmetrical. In FIG. 18, the numerals 16j denote parallel side surfaces in the radially inward portion. The present embodiment is also simpler in entire constitution than in the previous embodiments shown in FIGS. 12 to 16. Thus, the rotor having this embodiment is manufactured more easily and at a lower cost than in the previous embodiments. The effect of preventing radially outward escape of the permanent magnet 16 (escape during assembly to the silicon steel sheet 100 and during rotation of the rotor 4) is more stable than in the embodiment shown in FIG. 17. Furthermore, balanced magnetization can be performed from the circumferentially opposite surfaces, thus further improving magnetizability.

When the permanent magnet 16 of any of the embodiments shown in FIGS. 14 to 18 is used, it goes without saying that the permanent magnet inserting/holding space portion 102B of the silicon steel sheet 100 is also formed to match it.

In the rotor 4 of the invention, as clear from the above description, the following various embodiments are preferred: In one and/or the other of circumferentially side surfaces in the radially outward portion of each of the permanent magnets 16, there is formed a radially outward inclined surface 16d linearly extending in a direction in which the opposite side surfaces approach each other toward the radially outward end. The radially outward inclined surface 16d reaches the radially outward end. (See the embodiments shown in FIGS. 12 to 18.) In one and/or the other of circumferentially side surfaces in the radially inward portion except the radially outward portion of each of the permanent magnets 16, there is formed a radially inward inclined surface 16e linearly extending in a direction in which the opposite side surfaces approach each other toward the radially inward end. The radially inward inclined surface 16e reaches the radially inward end. The radially inward inclined surface 16e is formed on the circumferentially side surface on the same side as the circumferentially side surface where the radially outward inclined surface 16d has been formed. (See the embodiments shown in FIGS. 12 to 16.) The length of the radially inward inclined surface 16e in each of the permanent magnets 16 is greater than the length of the radially outward inclined surface 16d (see the embodiments shown in FIGS. 12 to 16). The circumferential width d in the radially inward portion except the radially outward portion in each of the permanent magnets 16 is constant over the entire region of the radially inward portion (see the embodiments shown in FIGS. 17 and 18).

Figure 19:
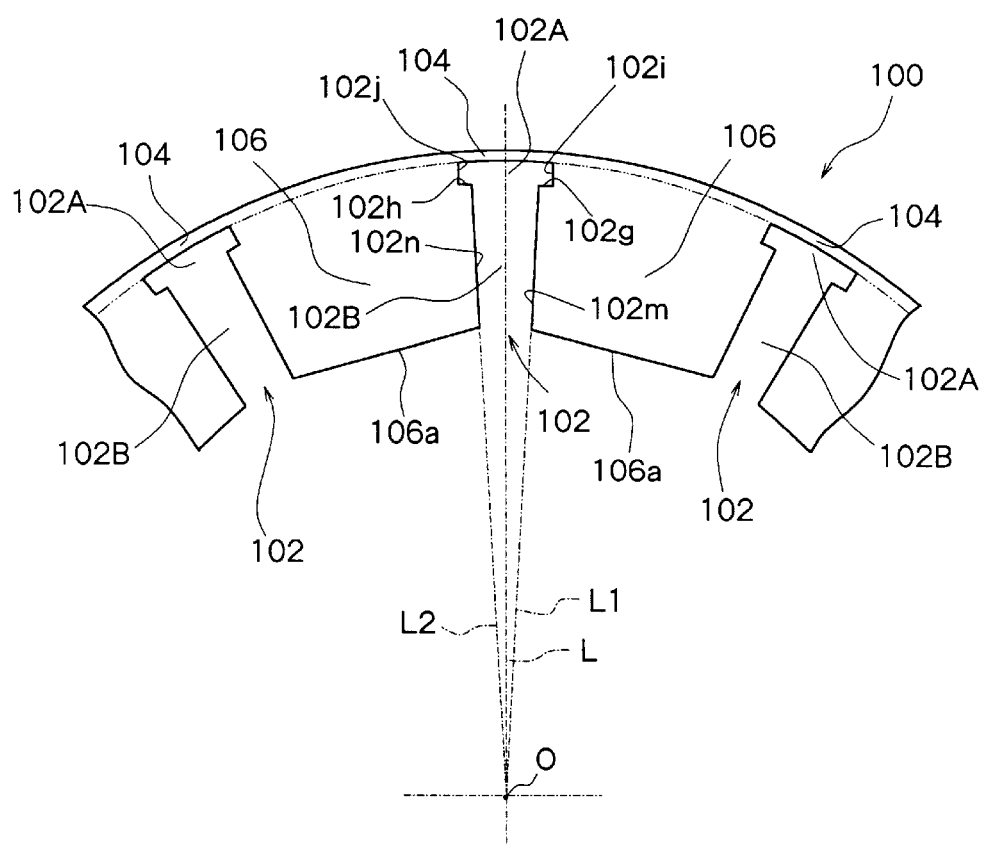
FIG. 19 is a plan view, like FIG. 6, showing an essential portion of another embodiment of the electromagnetic steel sheet for constituting the magnetic members to be disposed in the rotor.

FIG. 19 shows an essential portion of another embodiment of the silicon steel sheet 100. In the silicon steel sheet 100 shown in FIG. 19 (the silicon steel sheet 100 viewed in the axial direction), each of circumferentially opposed side surfaces 102i and 102j constituting the body portion filling space portion 102A of each of the aforementioned slots 102 extends linearly parallel to the aforementioned straight line L. Circumferentially opposed side surfaces 102m and 102n constituting the permanent magnet inserting/holding space portion 102B are present on straight lines L1 and L2 passing the axis center O and extending radially while circumferentially sandwiching the straight line L in a symmetrical relationship. Each of the body portion filling space portions 102A is in a circumferentially slender, nearly rectangular shape when viewed axially. Each of the permanent magnet inserting/holding space portions 102B, when viewed axially, is in a generally rectangular shape having a larger radial length than a circumferential width thereof, and is also in a generally trapezoidal shape having a circumferential width gradually narrowing from its radially outward end toward its radially inward end.

The circumferential width of each of the body portion filling space portions 102A is larger than the circumferential width of the corresponding permanent magnet inserting/ holding space portion 102B (i.e. the maximum width defined by the radially outward end). At the radial boundary between both space portions 102A and 102B and at the radially inward end of the space portion 102A, stepped portions 102g and 102h extending circumferentially are formed. The permanent magnet 16 (not shown) of nearly the same cross sectional shape as the permanent magnet inserting/holding space portion 102B is inserted into and held in each of the space portions 102B. Each of the space portions 102B has the circumferential width at the radially inward end made smaller than the circumferential width at the radially outward end thereof. Thus, the radially inward and outward escape of the inserted permanent magnet 16 can be prevented reliably, ensuring stable holding. The magnetizability after integral molding as the intermediate product of the rotor 4 is also obtained fully effectively similar to the previous embodiments. The reasons behind this are that the radial length of each of the body portion filling space portions 102A is short, and because of this shortness, each of the permanent magnets 16 has been moved radially outwardly. A radially inward end 106a of each of bases 106 circumferentially spaced from each other by the slots 102 and radially arranged with equal pitch extends tangentially linearly, but may have an arcuate shape concentric with the axis center O. In the embodiment shown in FIG. 19, the same protrusion 106b as in the embodiment shown in FIG. 6 may be formed at the radially inward end 106a of each of the bases 106.

The silicon steel sheets 100 constituted as above are laminated to form one magnetic material 180 as in the previous embodiments. The permanent magnets 16 are inserted into and held in the space portions 102B. Then, the rotor 4 can be manufactured by substantially the same method as in the previous embodiments, and substantially the same actions and effects can be obtained. The shape of the silicon steel sheet 100 shown in FIG. 19 is simplified in comparison with the shape of the silicon steel sheet 100 in the previous embodiments. Thus, its manufacture is even simpler, and can be produced at a lower cost. The shape of the permanent magnet 16 is also further simplified, and its manufacture is even easier. As the embodiment shown in FIG. 19, other embodiment is feasible in which the side surfaces 102m and 102n of the space portion 102B extend parallel to the straight line L. In this embodiment, each of the space portions 102B is substantially rectangular when viewed axially, and the cross sectional shape of the permanent magnet 16 inserted and held is also nearly rectangular. Thus, the shape of the permanent magnet 16 is further simplified, and its manufacture is easier, so that it can be manufactured at a lower cost. In this embodiment, the radially inward and outward escape of the permanent magnet 16 inserted in the space portion 102B can be prevented by performing the insertion of the permanent magnet 16 by press fitting. After integral molding by the body portion 20, radially outward escape can be prevented reliably by each of the space portions 102A.

The rotor of a rotating machine according to the invention has been described in detail above based on the embodiments with reference to the accompanying drawings. However, the invention is not restricted to these embodiments, and various other changes and modifications may be made without departing from the spirit and scope of the invention. For example, the rotating machine 2 in the embodiments is an electric generator, but may be an electric motor having substantially the same constitution as in the rotating machine 2. In this case, substantially the same actions and effects as described above can be obtained without doubt. In the embodiments, the magnetic material 180 (accordingly, each of the magnetic members 18) is composed of a laminate of the silicon steel sheets 100, an embodiment of an electromagnetic steel sheet. However, other embodiments in which the magnetic material 180 is composed of a laminate of other soft magnetic steel plates (steel plates having a relatively weak coercive force in comparison with electromagnetic steel sheets), for example, soft magnetic steel plates such as SPCC, SPHC, and SS41P, are of course feasible. In short, a laminate of steel plates formed from a magnetic material (may be a ferromagnetic material or a soft magnetic material), rather than a nonmagnetic material, is acceptable. There may also be other embodiments in which the magnetic material 180 (accordingly, each of the magnetic members 18) is composed of a block integrally formed beforehand from a magnetic material, rather than a laminate of electromagnetic steel sheets.

In the embodiments, moreover, the body portion 20 into which the sleeve 14, the magnetic material 180 (accordingly, each of the magnetic members 18), and each of the permanent magnets 16 are integrally cast is formed from a non-magnetic metal material such as an aluminum alloy or a zinc alloy, but may be formed from a nonmetallic material such as high strength synthetic resin having heat resistance. Furthermore, in the embodiments, the sleeve 14 constituting shaft means, the magnetic material 180, and each of the permanent magnets 16 are integrally cast, whereafter the rotating shaft 12 is press fitted into the sleeve 14. However, there may be other embodiments in which the rotating shaft 12 is directly cast integrally together with the magnetic material 180 and each of the permanent magnets 16 without using the sleeve 14. In this case, it is desired to apply sufficient masking to the rotating shaft 12 so that a molten material, such as an aluminum alloy, will not adhere to a portion of the rotating shaft 12 which need not be cast. Besides, in the embodiments, the sleeve 14, the magnetic material 180, and each of the permanent magnets 16 are integrally cast, whereafter the outer peripheral surface of the magnetic material 180 is cut in the aforementioned manner. However, there may be embodiments in which the rotating shaft 12 is press fitted into the sleeve 14, whereafter cutting is performed at the outer peripheral surface of the magnetic material 180. In addition, in the embodiments, the rotating shaft 12 is press fitted into the sleeve 14, whereafter rotation balancing is effected. However, there may be embodiments in which balancing is effected before the rotating shaft 12 is press fitted into the sleeve 14.

What is claimed is:

1. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft; and further comprising space portions each having a surface disposed on said outer peripheral surface of said body portion and a volume between adjacent magnetic members and one of said permanent magnets disposed between said adjacent magnetic members;

wherein said body portion is disposed so as to fill said space portions and gaps between said permanent magnets and said magnetic members and an outer peripheral surface of said shaft and covering surfaces of said permanent magnets furthest away from said axis of rotation of said shaft to a predetermined thickness, said exposed end surfaces of said magnetic members being substantially co-planar with said outer peripheral surface of said body portion.

2. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft; and wherein each permanent magnet has a cross-section in a plane perpendicular to said axis of rotation of said shaft comprising a quadrilateral having a triangle extending outward of said quadrilateral, two corners of said quadrilateral forming vertices of said triangle.

3. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft; and wherein said circumferential length is in a range of 1.5 to 2.0 times said radial length wherein each permanent magnet has a cross-section in a plane perpendicular to said axis of rotation of said shaft comprising a quadrilateral having a triangle extending outward of said quadrilateral, two corners of said quadrilateral forming vertices of said triangle.

4. The rotor as recited in claim 1, wherein each permanent magnet has a cross-section in a plane perpendicular to said axis of rotation of said shaft comprising a quadrilateral having a triangle extending outward of said quadrilateral, two corners of said quadrilateral forming vertices of said triangle.

5. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft; and wherein each permanent magnet has a cross-section in a plane perpendicular to said axis of rotation of said shaft comprising a quadrilateral having two triangles extending outward of opposite sides of said quadrilateral, two corners of said opposite sides of said quadrilateral forming respective vertices of said triangles.

6. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft;

wherein said circumferential length is in a range of 1.5 to 2.0 times said radial length; and wherein each permanent magnet has a cross-section in a plane perpendicular to said axis of rotation of said shaft comprising a quadrilateral having two triangles extending outward of opposite sides of said quadrilateral, two corners of said opposite sides of said quadrilateral forming respective vertices of said triangles.

7. The rotor as recited in claim 1, wherein each permanent magnet has a cross-section in a plane perpendicular to said axis of rotation of said shaft comprising a quadrilateral having two triangles extending outward of opposite sides of said quadrilateral, two corners of said opposite sides of said quadrilateral forming respective vertices of said triangles.

8. A rotor of a rotating machine, the rotor comprising:

a shaft having an axis of rotation;

a cylindrical body portion having said shaft disposed substantially integrally therein such that an axis of rotation of said cylindrical body portion is co-linear with said axis of rotation of said shaft, said body portion comprising a non-magnetic material and having a substantially circular outer peripheral surface and having opposite side surfaces disposed in planes perpendicular to said axis of rotation of said body portion;

permanent magnets and magnetic members provided integrally within said body portion and arranged radially and circumferentially alternating and in intimate contact with each other, each of said permanent magnets being completely embedded in said body portion and each of said magnetic members having only a radially outward end surface thereof comprising a portion of said outer peripheral surface of said body portion being exposed and having all other surfaces thereof being embedded in said body portion;

wherein said shaft, said permanent magnets, said magnetic members, and said body portion being integrated upon said body portion being cast; and wherein a circumferential length, defined to be a greatest distance between surfaces of adjacent magnets, is larger than a radial length of one of said magnets, said radial length being defined to be a distance between a point on said magnet closest to said axis of rotation of said shaft and a point on said magnet furthest away from said axis of rotation of said shaft; and wherein each permanent magnet has a cross-section in a plane perpendicular to said axis of rotation of said shaft comprising a quadrilateral having a trapezoid extending outward of one side of said quadrilateral.

\* \* \* \* \*